Figure 1:
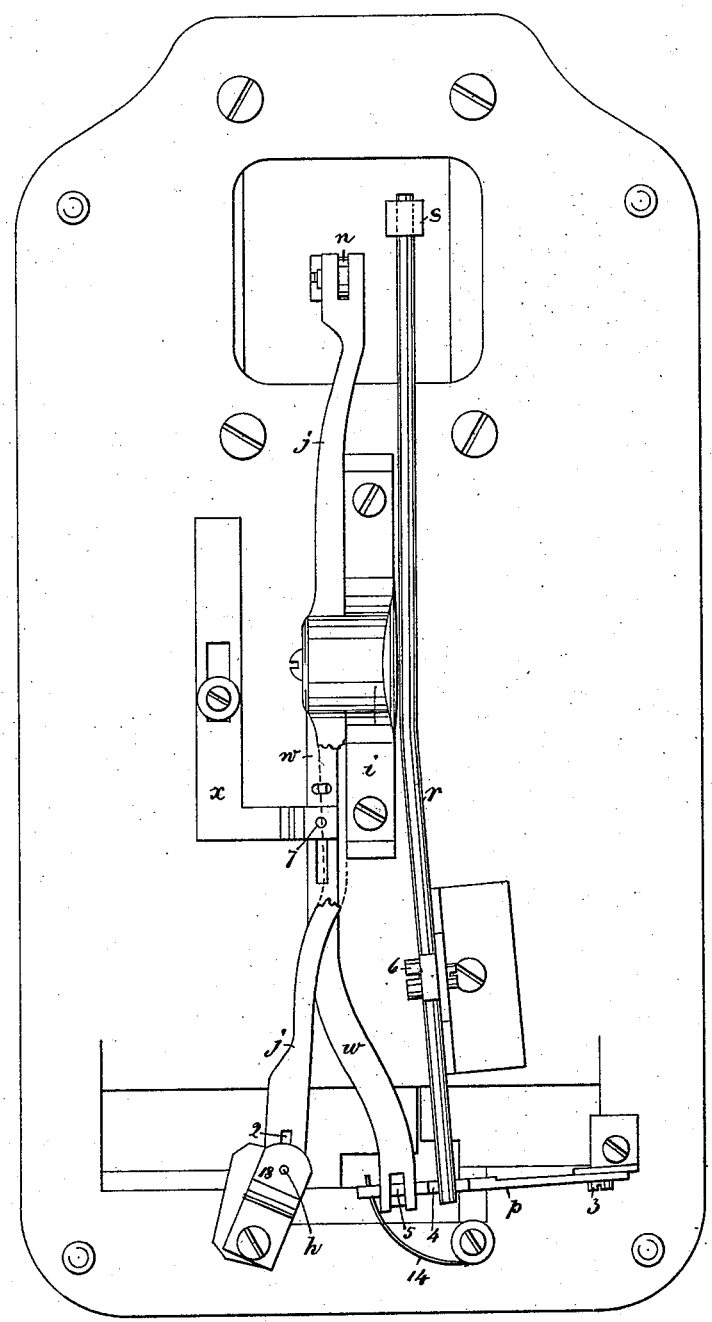

(Model.)

2 Sheets—Sheet 1.

E. T. THOMAS.
Sewing Machine.

No. 230,677.  Patented Aug. 3, 1880.

Witnesses.
L. F. Connor.
Jos. P. Livermore.

Inventor.
Eddy T. Thomas,
by Crosby & Gregory Attys (Model.)
E. T. THOMAS.
Sewing Machine.
No. 230,677. Patented Aug. 3, 1880.
2 Sheets—Sheet 2.
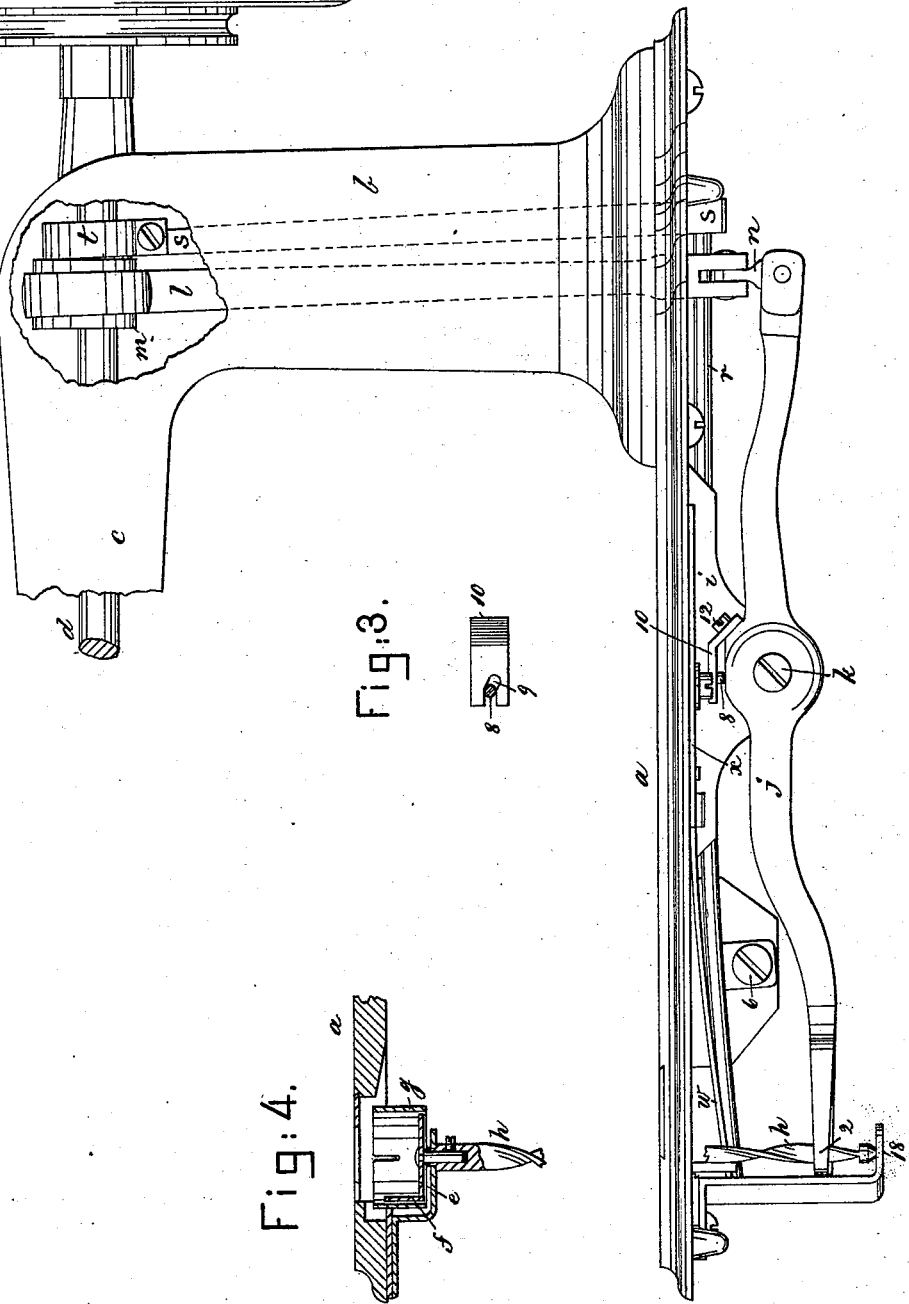
Witnesses.
L. F. Connor.
Jos. P. Livermore
Inventor.
Eddy T. Thomas.
by Crosby Gregory Attys

UNITED STATES PATENT OFFICE.

EDDY T. THOMAS, OF NEW YORK, N. Y., ASSIGNOR TO THE GOLD MEDAL SEWING MACHINE COMPANY, OF ORANGE, MASSACHUSETTS.

SEWING-MACHINE.

SPECIFICATION forming part of Letters Patent No. 230,677, dated August 3, 1880.

Application filed March 1, 1880. (Model.)

*To all whom it may concern:*

Be it known that I, EDDY T. THOMAS, of the city, county, and State of New York, have invented an Improvement in Sewing-Machines, of which the following description in connection with the accompanying drawings, is a specification.

This invention relates to improvements in sewing-machines employing a rotary reciprocating or oscillating shuttle, it oscillating substantially about its own center in a horizontal plane.

One part of this invention consists in an oscillating shuttle-carrier having a spirally twisted or grooved shaft combined with a vibratable lever and connected link, and a rotatable needle-bar-actuating shaft to operate the said link and lever and oscillate the shuttle carrier.

My invention also relates to means for operating the four-motioned feeding device, as will be hereinafter more fully described.

Figure 1 represents an under-side view of a sewing-machine provided with my improvements; Fig. 2, a side elevation of a sufficient portion thereof to illustrate my present invention. Fig. 3 is a detail of the arm to actuate the lever that moves the feeding device forward, and Fig. 4 a detail showing the shuttle-carrier and shuttle-race as they will be made in practice.

The bed-plate $a$, standard $b$, overhanging arm $c$, and main driven shaft $d$ are and may be of usual construction—as, for instance, in the "Domestic" or in "Home" shuttle sewing-machines. The said shaft $d$ is employed to operate the needle-bar and needle, all as usual.

The shuttle-carrier $e$ (shown as located within an annular shuttle-race or receiving-chamber, $g$, and provided with a shuttle-engaging horn, $f$,) will be connected with the upper end of the twisted or spirally-grooved shaft $h$, substantially as in United States Patent No. 188,515.

The lever $j$, pivoted at $k$ upon an ear or lug, $i$, at the under side of the bed-plate $a$, has its forward end forked, as at 2, to embrace this twisted shaft $h$, and cause it and the shuttle-carrier to oscillate as the lever $j$ is vibrated upon its horizontal pivot $k$ by the action upon it of the connecting-rod $l$, shaped at its upper end to surround an eccentric, $m$, on the main shaft $a$, and connected by a short link, $n$, with the rear end of the said lever $j$.

The needle-actuating mechanism and take-up, (not herein shown,) as well as the shuttle itself, may be of any usual construction.

The four-motioned feed-bar $p$, (shown in Fig. 1,) of any usual shape, supported at one end upon the stud 3, has at its lower edge two notches, 4 5, the former to receive the end of the feed-lifting rod $r$, pivoted to move about the horizontal pivot 6. The rear end of this lever $r$ is extended loosely through a hole made for it in the link $s$, pivoted upon the eccentric-strap $t$, which surrounds an eccentric on the shaft $d$.

The lever $w$, for moving the feed-bar forward, has its pivot at 7, on the usual movable fulcrum-slide $x$. This lever has at its rear end a pin, 8, (see Fig. 1,) that enters the slot 9 in the arm 10, secured to the vibratable lever $j$ at 12.

Shaft $h$ is supported at its lower end by step 18. This one lever $j$, it will be seen, is made to oscillate both the shuttle and to move the feed-bar forward. The feed-bar is thrown down and back by the spring 14.

I am aware that it is not new to move the feed-bar by means of rods and levers connected with a vibrating shuttle-actuating lever.

I have aimed to produce a rapidly-running, easily-operated machine, simple in construction and economical to build, and by the devices described it is possible to oscillate the shuttle at high speed without the employment of toothed gearing.

I do not broadly claim an oscillating shuttle-carrier at the upper end of an oscillating shaft, nor do I broadly claim a spirally-twisted shaft and a lever to move it, as I am well aware that substantially such devices have been long used in the well-known Grover & Baker machine.

I am also aware that it is customary to oscillate the spirally-twisted shaft of a shuttle-driver by means of a long elbow-lever having its pivot at the rear of the machine, the upper end of the said lever being directly acted upon and moved by a cam or eccentric on the rotating needle-operating shaft.

The system of links and levers herein described enable me to make a more compact machine.

I claim—

1. The shuttle-carrier, its spirally-twisted shaft and lever $j$, pivoted below the bed-plate, combined with the main rotatable shaft $d$, eccentric $m$, connecting-rod $l$, and link $n$, to operate substantially as shown and described.

2. The rotatable shaft $d$, eccentric $m$, connecting-rod $l$, and connected lever $j$, mounted upon the horizontal pivot $k$, and the arm 10, carried by the said lever, combined with the lever $w$, connected with and moved by the said arm, the lever $r$, its link $s$, and the feed-bar, the lever $w$ moving the feed-bar forward and the lever $r$ lifting it at the proper times, as shown and described.

In testimony whereof I have signed my name to this specification in the presence of two subscribing witnesses.

EDDY T. THOMAS.

Witnesses:
SPENCER C. DOTY,
ALLEN P. CREQUE.